US009258682B2

(12) United States Patent
Matsubara

(10) Patent No.: US 9,258,682 B2
(45) Date of Patent: Feb. 9, 2016

(54) SERVER APPARATUS, SERVER CONTROL PROGRAM, AND SERVER CLIENT SYSTEM

(71) Applicant: CASIO COMPUTER CO., LTD., Shibuya-ku, Tokyo (JP)

(72) Inventor: Kunihiro Matsubara, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 351 days.

(21) Appl. No.: 13/772,450

(22) Filed: Feb. 21, 2013

(65) Prior Publication Data

US 2013/0178196 A1 Jul. 11, 2013

Related U.S. Application Data

(62) Division of application No. 11/766,955, filed on Jun. 22, 2007, now abandoned.

(30) Foreign Application Priority Data

Jun. 23, 2006 (JP) ................................. 2006-173946

(51) Int. Cl.
*H04M 11/00* (2006.01)
*H04W 4/16* (2009.01)
*H04M 3/493* (2006.01)

(52) U.S. Cl.
CPC .............. *H04W 4/16* (2013.01); *H04M 3/4931* (2013.01); *H04M 3/4935* (2013.01); *H04M 2203/6009* (2013.01)

(58) Field of Classification Search
CPC .................................................. H04M 3/42042
USPC .......... 379/93.23, 29.1, 88.11, 201.04, 355.1, 379/355.09; 455/158.4, 158.5, 414.1, 566
See application file for complete search history.

(56) References Cited

U.S. PATENT DOCUMENTS

| | | | |
|---|---|---|---|
| 6,076,093 A | 6/2000 | Pickering | |
| 7,092,511 B1 * | 8/2006 | Kusaka et al. | ........... 379/355.09 |
| 2004/0151300 A1 | 8/2004 | Marwell et al. | |
| 2004/0217980 A1 * | 11/2004 | Radburn et al. | ............... 345/672 |

(Continued)

FOREIGN PATENT DOCUMENTS

| | | |
|---|---|---|
| CN | 1446333 | 10/2003 |
| JP | 2002-064654 | 2/2002 |

(Continued)

OTHER PUBLICATIONS

International Search Report for PCT/JP2007/062949 dated Nov. 22, 2007.

(Continued)

*Primary Examiner* — Yosef K Laekemariam
(74) *Attorney, Agent, or Firm* — Amin, Turocy & Watson, LLP

(57) ABSTRACT

A server-client system includes a client terminal having a telephone function, and a server apparatus on a network. The terminal displays telephone number display screen data received form the server apparatus, and transmits, to the server apparatus, designation information indicating a telephone number position in the display screen, which is designated by a user. The server apparatus transmits designated telephone number outgoing call data to the terminal based on the designation information. The terminal makes an outgoing call in accordance with the telephone number outgoing call data received from the server apparatus.

7 Claims, 9 Drawing Sheets

DISPLAY ON SERVER 35

| NAME | TELEPHONE NUMBER | EMAIL ADDRESS | ADDRESS |
|---|---|---|---|
| ○山△男 | 03-1234-5678 | abcd@efg.co.jp | ○○市××町1-2-3 |
| ×田口彦 | 042-555-1111 | hijk@lmn.co.jp | □□区△△1-1○○ビ |
| △川○子 | 090-9876-5432 | | |
| □本×美 | 045-123-4567 | | |
| · | · | | |
| · | · | | |
| · | · | | |
| · | · | | |
| · | · | | |

(56) References Cited

U.S. PATENT DOCUMENTS

| | | |
|---|---|---|
| 2005/0070262 A1 | 3/2005 | Weigand |
| 2007/0192509 A1 | 8/2007 | Ohtsuka et al. |
| 2007/0234229 A1 | 10/2007 | Ohtsuka et al. |
| 2007/0245021 A1 | 10/2007 | Ohtsuka et al. |

FOREIGN PATENT DOCUMENTS

| | | |
|---|---|---|
| JP | 2003-158534 | 5/2003 |
| JP | 2003-323402 | 11/2003 |
| JP | 2004-503862 | 2/2004 |
| JP | 2004-171063 | 6/2004 |
| JP | 2007-507928 | 3/2007 |
| KR | 1020030011459 | 2/2003 |

OTHER PUBLICATIONS

Written Opinion for PCT/JP2007/062949 dated Nov. 22, 2007.
Korean Office Action for 10-2008-7027901 mailed on Jun. 18, 2010.
Japanese Office Action for 2006-173946 mailed on Dec. 14, 2010.
Korean Office Action for 10-2008-7027901 mailed on Dec. 21, 2010.
Japanese Office Action Decision of Rejection for 2006-173946 mailed on Mar. 29, 2011.
Chinese Office Action for Chinese Patent Application No. 200780019720.0 mailed on Aug. 18, 2011.

* cited by examiner

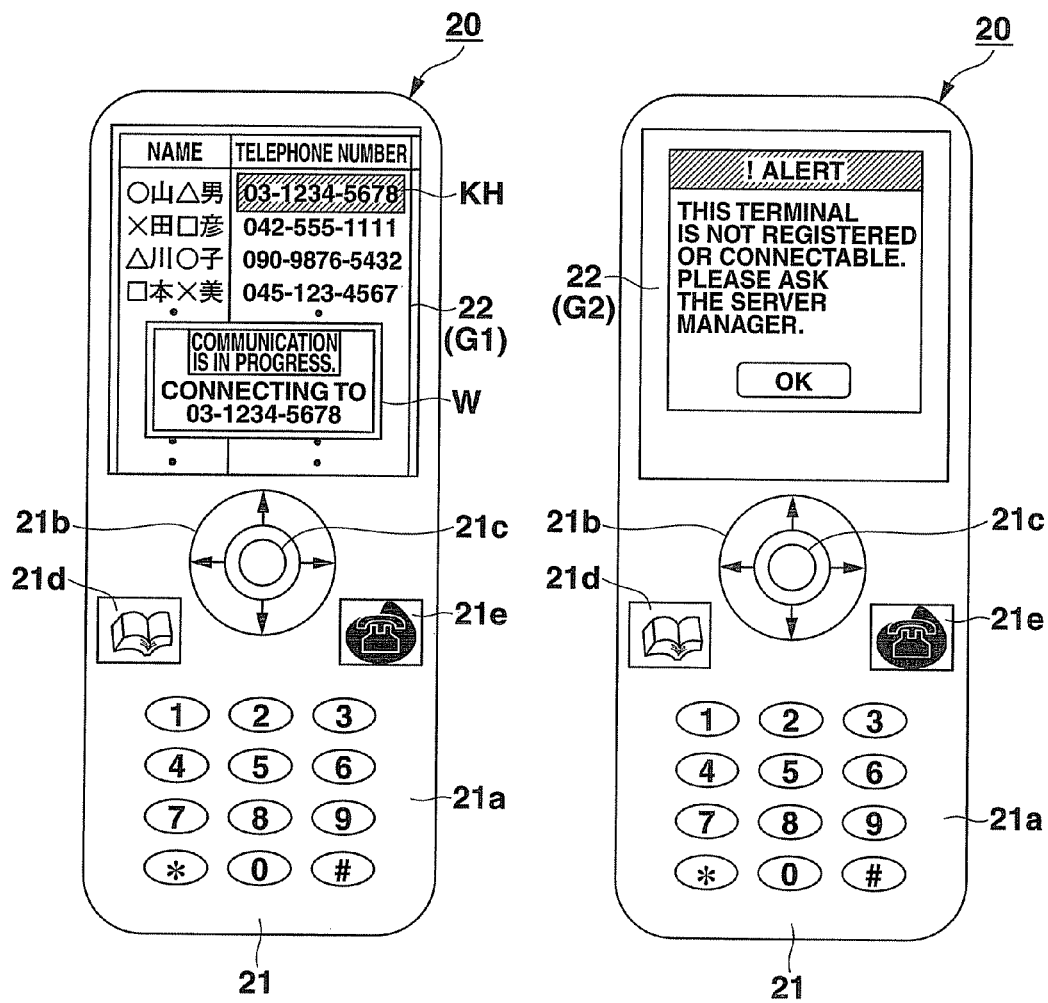

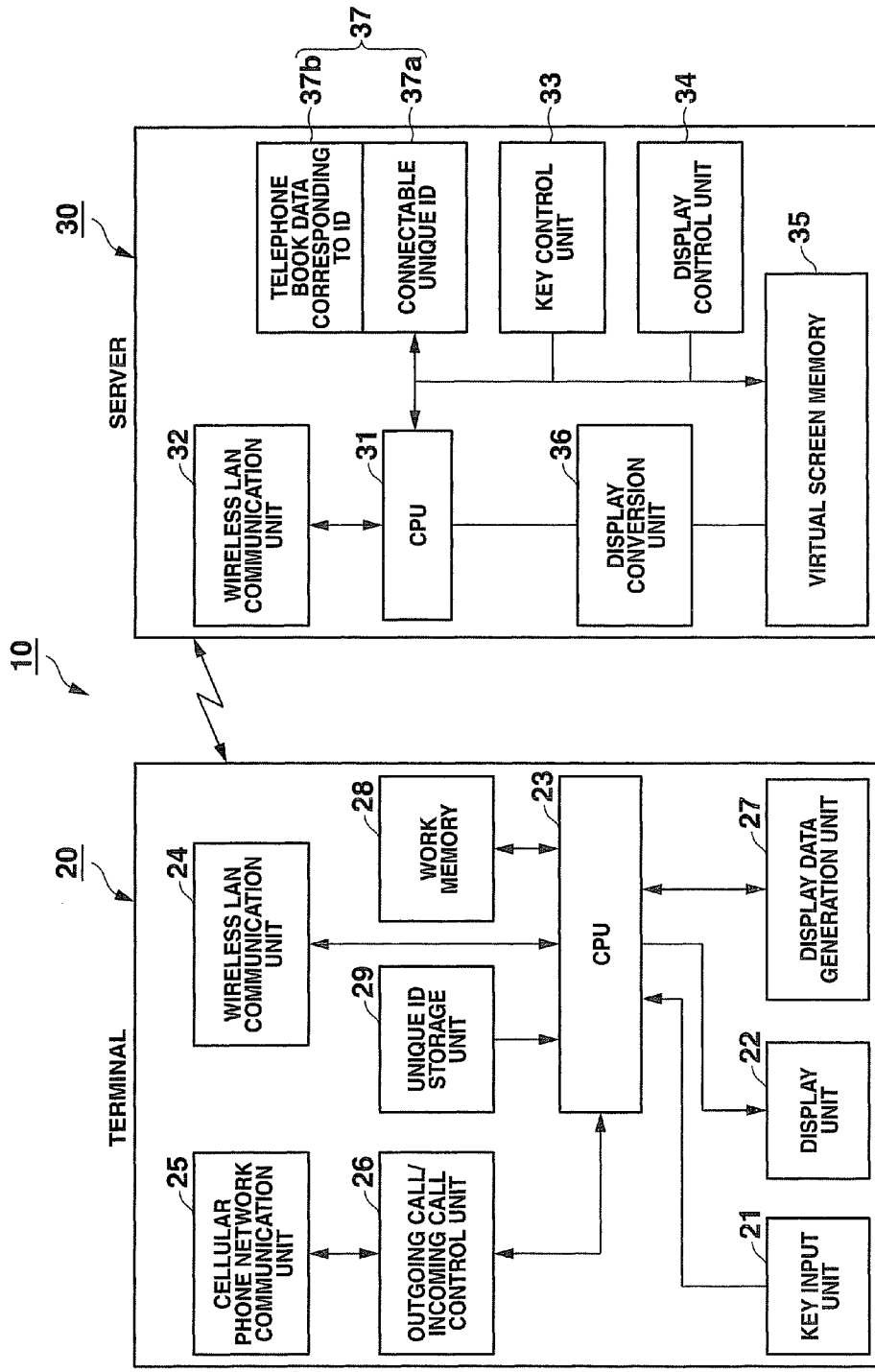

FIG.4A

DISPLAY ON SERVER 35

| NAME | TELEPHONE NUMBER | EMAIL ADDRESS | ADDRESS |
|---|---|---|---|
| ○山△男 | 03-1234-5678 | abcd@efg.co.jp | ○○市××町1-2-3 |
| ×田□彦 | 042-555-1111 | hijk@lmn.co.jp | □□区△△1-1○○ビ |
| △川○子 | 090-9876-5432 | | |
| □本×美 | 045-123-4567 | | |
| ･･･ | ･･･ | | |

FIG.4B

DISPLAY ON TERMINAL 22

| NAME | TELEPHONE NUMBER |
|---|---|
| ○山△男 | 03-1234-5678 |
| ×田□彦 | 042-555-1111 |
| △川○子 | 090-9876-5432 |
| □本×美 | 045-123-4567 |
| ･･･ | ･･･ |

G1

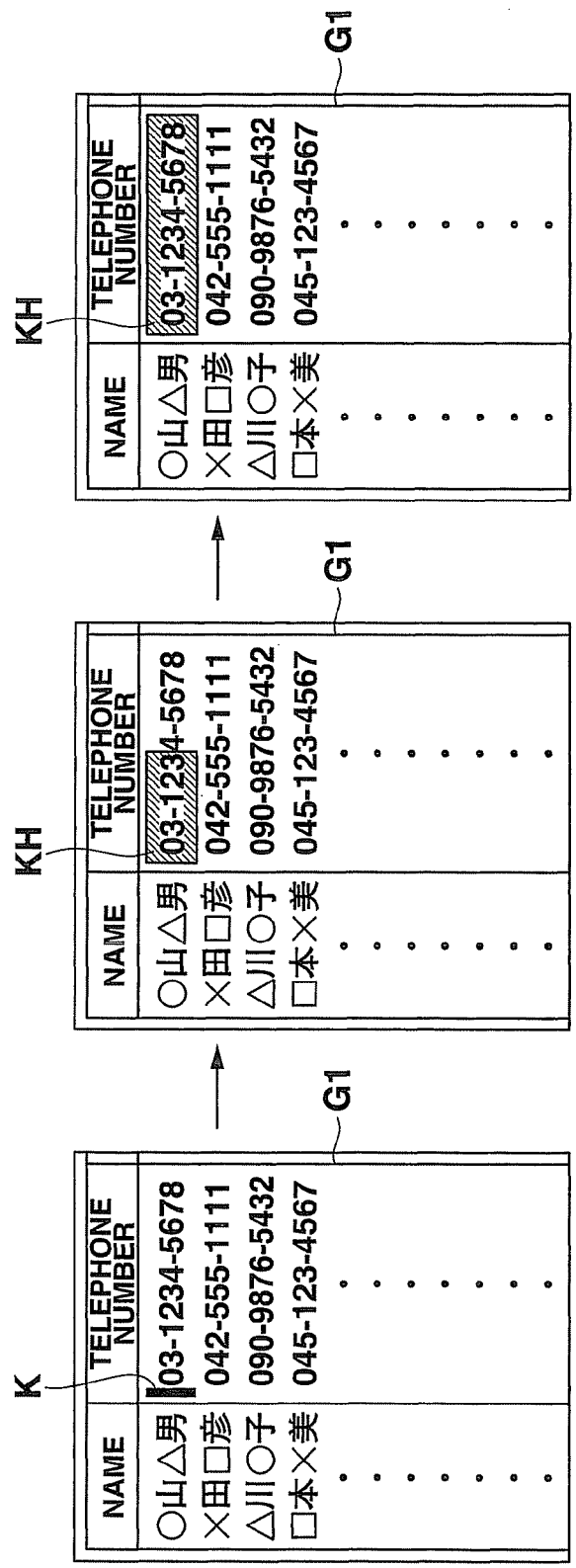

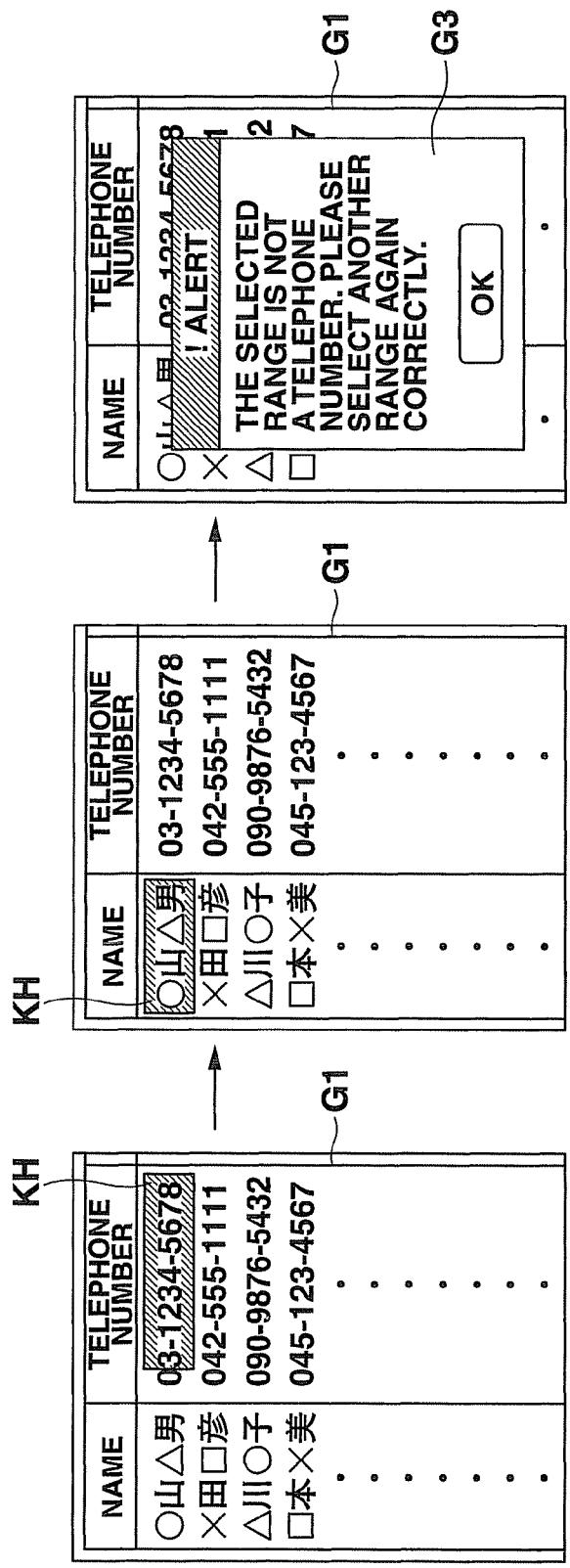

SERVER APPARATUS, SERVER CONTROL PROGRAM, AND SERVER CLIENT SYSTEM

CROSS-REFERENCE TO RELATED APPLICATIONS

This application is a Division of application Ser. No. 11/766,955 filed Jun. 22, 2007, the entire contents of which are incorporated herein by reference.

This application is based upon and claims the benefit of priority from the prior Japanese Patent Application No. 2006-173946, filed Jun. 23, 2006, the entire contents of which are incorporated herein by reference.

BACKGROUND

Conventionally, in order to make a phone call from a communication terminal such as a cellular phone, the communication terminal displays telephone book data which contains a plurality of telephone numbers of acquaintances and friends in advance. The user selects a desired destination telephone number from the displayed telephone book data, and operates an outgoing call button to make an outgoing call to the selected telephone number.

In this case, a memory in the communication terminal stores, as number data, each telephone number data contained in the telephone book data. Hence, the outgoing call can be made in accordance with the number data merely by selecting the desired telephone number to make the outgoing call.

However, if a third party comes into possession of such communication terminal which has been lost or stolen, the third party may read out highly confidential stored data, such as personal information, as well as the telephone book data stored in the memory in the terminal.

On the other hand, in a recent server-client system, an SBC (Server Based Computing) system [thin client system] has been introduced (e.g., see Jpn. Pat. Appln. KOKAI Publication Nos. 2004-171063 and 2003-158534). In this system, all applications which are input/output and displayed by each communication terminal (a cellular phone, PC, or the like) start and are executed by a server, and the server also manages all files generated along with these applications.

In such a thin client system, the drawing data of application software executed by the server is transferred to the communication terminal to display this drawing data on the communication terminal (e.g., see PCT (WO) 2004-503862).

Accordingly, in this thin client system, the server stores and manages the telephone book data, transfers the drawing data to the communication terminal, and causes it to display the transferred drawing data as needed. This can prevent unauthorized access and disclosure of the telephone book data even if a third party obtains the communication terminal.

In the thin client system, however, any type of data transferred to and received from the server in response to the operation of the communication terminal is the drawing data generated in accordance with the screen of the terminal. Hence, the communication terminal cannot make an outgoing call by directly using the telephone book data received from the server and displayed on the communication terminal.

SUMMARY

A server apparatus, server control program, and server-client system capable of causing a communication terminal to make an outgoing call by using telephone number data such as telephone book data stored and managed by a server in a thin client system are provided.

For example, there is provided a server-client system including a client terminal having a telephone function, and a server apparatus on a network.

The terminal includes a telephone number designation transmission component for transmitting a telephone number instruction to the server apparatus in response to a user operation, a telephone number display control component for displaying telephone number display screen data received from the server apparatus in response to transmission of the telephone number instruction from the telephone number instruction transmission component, a position designation information transmission component for transmitting, to the server apparatus, position designation information in a telephone number display screen in response to the user operation on a telephone number display screen displayed by the telephone number display control component, and an outgoing call control component for making an outgoing call in accordance with telephone number outgoing call data received from the server apparatus, in response to the position designation information in the telephone number display screen, which is transmitted from the position designation information transmission component.

The server apparatus includes a communication component for communicating with a terminal, a telephone number storage component for storing telephone number data, a telephone number screen generation component for, when the communication component receives a telephone number instruction from the terminal, generating telephone number display screen data based on the telephone number data stored in the telephone number storage component, a telephone number screen transmission control component for controlling the communication component to transmit, to the terminal, the telephone number display screen data generated by the telephone number screen generation component, an outgoing call data generation component for generating outgoing call data in accordance with a telephone number at a telephone number position corresponding to position designation information when the communication component receives the position designation information in the telephone number screen from the terminal after the telephone number screen transmission control component transmits the telephone number display screen data to the terminal, and a number outgoing call data transmission control component for controlling the communication component to transmit, to the terminal, the telephone number outgoing call data generated by the outgoing call data generation component.

In the server-client system, the terminal controls an outgoing call in accordance with outgoing call data such as a telephone number received from the server apparatus. Hence, confidentiality can be secured without storing and holding the telephone number data in the terminal. Additionally, the terminal can also make the outgoing call upon designating a desired telephone number position on a telephone number display screen, in the bitmap format or the like, which is transmitted from the server apparatus to the cellular phone and displayed on it.

Accordingly, a server apparatus, server control program, and server-client system capable of causing the communication terminal to make an outgoing call by using telephone number data stored and managed by the server in the thin client system are provided.

Advantages of the invention will be set forth in the description which follows, and in part will be obvious from the description, or may be learned, by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A and 2B are front views showing the outer appearance of a cellular phone 20 serving as a client terminal in the server-client system 10, in which FIG. 2A is a view showing a state wherein a communication progress screen W is displayed based on display of a telephone book list telephone number display screen G1 received from a server apparatus 30, and FIG. 2B is a view showing a state wherein a connection rejection alert screen G2 received from the server apparatus 30 is displayed;

FIGS. 3A and 3B are block diagrams showing the arrangement of an electronic circuit in the server-client system 10, in which FIG. 3A is a block diagram showing the arrangement of the cellular phone 20 serving as the client terminal, and FIG. 3B is a block diagram showing the arrangement of the server apparatus 30;

FIGS. 4A and 4B are views showing the contents of telephone book display data obtained when the server apparatus 30 executes a telephone book application process in response to an instruction to operate a telephone book button 21d on the cellular phone (terminal) 20 in the server-client system 10, in which FIG. 4A is a view showing telephone book list display data read out from a data storage unit 37 to a virtual screen memory 35, and FIG. 4B is a view showing telephone book list drawing data converted and generated in accordance with the screen size of the terminal by a display data conversion unit 36;

FIGS. 7A to 7C are views showing telephone number range designation display states on the telephone book list telephone number display screen G1 displayed on the cellular phone (terminal) 20 in the server-client system; and FIGS. 8A to 8C are views showing telephone number error range designation display states on the telephone book list telephone number display screen G1 displayed on the cellular phone (terminal) 20 in the server-client system, and a number range reselection alert screen G3 as a range selection result.

DETAILED DESCRIPTION

Figure 1:
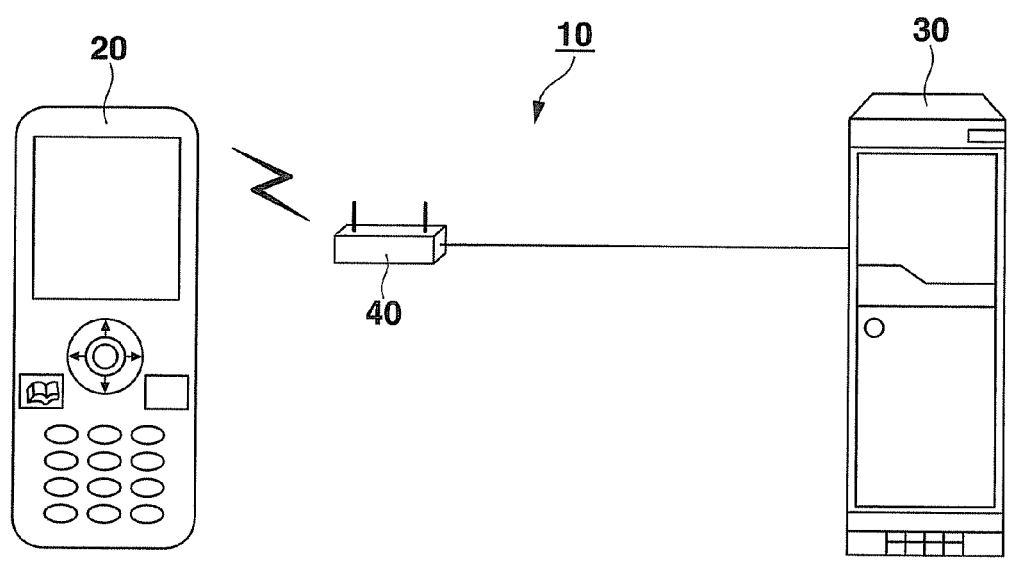
FIG. 1 is a view showing the entire arrangement of a server-client system 10 according to an embodiment of the subject invention.

FIG. 1 is a view showing an exemplary arrangement of a server-client system 10 according to an embodiment of the subject invention.

The server-client system 10 serves as a thin client system including a server apparatus 30 which can connect to a cellular phone 20 with a conventional telephone communication function as a client terminal on a wireless LAN (Local Area Network). When the cellular phone 20 is connected to the server apparatus 30 via an access point 40 of the wireless LAN, the server-client system 10 including the cellular phone 20 and server apparatus 30 functions as a thin client system.

Note that the access point 40 of the wireless LAN may serve as the access point 40 in an intra-enterprise network, or the access point 40 as a hotspot in a public wireless LAN in the Internet.

FIGS. 2A and 2B are front views showing the outer appearance of the cellular phone 20 serving as a client terminal in the server-client system 10, in which FIG. 2A is a view showing a state wherein a communication progress screen W is displayed based on display of a telephone book list telephone number display screen G1 received from the server apparatus 30, and FIG. 2B is a view showing a state wherein a connection rejection alert screen G2 received from the server apparatus 30 is displayed.

A key input unit 21 is arranged at the lower portion on the front surface of the cellular phone 20, and a liquid crystal display unit 22 is arranged at the upper portion on the front surface of the cellular phone 20. Alternatively, the key input unit 21 and the liquid crystal display unit 22 can be oriented differently, such as side-by-side or on different surfaces of a cellular phone (not shown).

The key input unit 21 includes text/symbol input keys 21a to input numerical data and/or various text/symbol data, a cursor key 21b to move a cursor, a determination/execution key 21c to instruct to determine/execute an item selected by cursor movement, a telephone book button 21d to start a telephone book application, and an outgoing call/incoming call button 21e to instruct making or receiving an outgoing call/incoming call.

FIGS. 3A and 3B are block diagrams showing the arrangement of an electronic circuit in the server-client system 10, in which FIG. 3A is a block diagram showing the arrangement of the cellular phone 20 serving as the client terminal, and FIG. 3B is a block diagram showing the arrangement of the server apparatus 30.

The cellular phone 20 includes a CPU (Central Processor Unit) 23 serving as a computer, which controls the operation of each part of the circuit in accordance with a cellular phone control program which is stored in advance and executed by the CPU 23.

The CPU 23 connects to the key input unit 21 and the liquid crystal display unit 22. Additionally, for example, the CPU 23 connects to a wireless LAN communication unit 24 to connect to the server apparatus 30 via the wireless LAN, an outgoing call/incoming call control unit 26 to control a cellular phone network communication unit 25 that controls an outgoing call/incoming call, a display data generation unit 27 to generate display data in accordance with display drawing data transferred from the server apparatus 30 to the cellular phone 20, a work memory 28, and a unique ID storage unit 29 which stores an identifier (ID) unique to the cellular phone 20 for connection authentication to the server apparatus 30.

The cellular phone 20 functions as a conventional cellular phone terminal when being used alone, but also functions as the client terminal having the telephone communication function in the thin client system when connected to the server apparatus 30. Although only one cellular phone is shown, the server-client system 10 may include a plurality of cellular phones.

The server apparatus 30 includes a CPU (Central Processor Unit) 31 serving as a computer, which controls the operation of each part of the circuit in accordance with a server control program which is stored in advance and executed by the CPU 31.

The CPU 31 connects to a wireless LAN communication unit 32, a key control unit 33, a display control unit 34 and virtual screen memory 35, a display data conversion unit 36, a data storage unit 37, and the like. The wireless LAN communication unit 32 communicates with various types of client terminals on the network via the wireless LAN. The key control unit 33 instructs the CPU 31 to execute an application process corresponding to a key operation signal received from the client terminal 20. The display control unit 34 and virtual screen memory 35 store and hold, as display data for each terminal 20, the display data which is generated in accordance with the application process corresponding to the key operation signal for each terminal 20. The display data conversion unit 36 converts the display data stored and held in the virtual screen memory 35 for each terminal 20 into drawing data so as to match the screen size of the display unit 22 of the terminal 20, extracts only a portion of the drawing data different from that generated for the terminal 20 immediately before the conversion process, and transfers the extracted drawing data to the terminal 20. The data storage unit 37 stores and registers an identifier (ID) 37a unique to each terminal 20 capable of being connected to the server apparatus 30, and stores and manages telephone book data 37b corresponding to the respective terminal IDs 37a.

FIGS. 4A and 4B are views showing the contents of telephone book display data obtained when the server apparatus 30 executes a telephone book application process in response to an instruction to operate the telephone book button 21d on the cellular phone (terminal) 20 in the server-client system 10. FIG. 4A is a view showing telephone book list display data read out from a data storage unit 37 to a virtual screen memory 35, and FIG. 4B is a view showing a telephone number display screen indicating the telephone book list drawing data which is converted in accordance with the screen size of the terminal by a display data conversion unit 36.

That is, upon reception of a telephone book application process start instruction in response to the operation of the telephone book button 21d of the cellular phone (terminal) 20 which stores a unique identifier 37a to connect to the server apparatus 30, the server apparatus 30 reads out the telephone book data 37b stored and managed in correspondence with the terminal IDs 37a. As shown in FIG. 4A, the readout data are expanded and stored in the virtual screen memory 35 corresponding to the terminal 20, as telephone book list display screen data in the bitmap format or the like.

As shown in FIG. 4B, the display data conversion unit 36 converts the telephone book list display data in the virtual screen memory 35 into the telephone book list drawing data so as to match the screen size of the terminal which typically displays suitable items such as "name" and "telephone number". The converted telephone book list drawing data is then transferred to the cellular phone (terminal) 20 serving as a start instruction source of the telephone book application process, and displayed on the cellular phone 20. The cellular phone (terminal) 20 may display all or a portion of the telephone book list display data in the virtual screen memory 35.

The telephone book data stored and managed by the server apparatus 30 in the thin client system is transferred as the display screen data to the cellular phone 20, and displayed on the cellular phone 20. An operation performed when an outgoing call is made by using the telephone number of the displayed telephone book list is described in detail below.

Figure 5A:
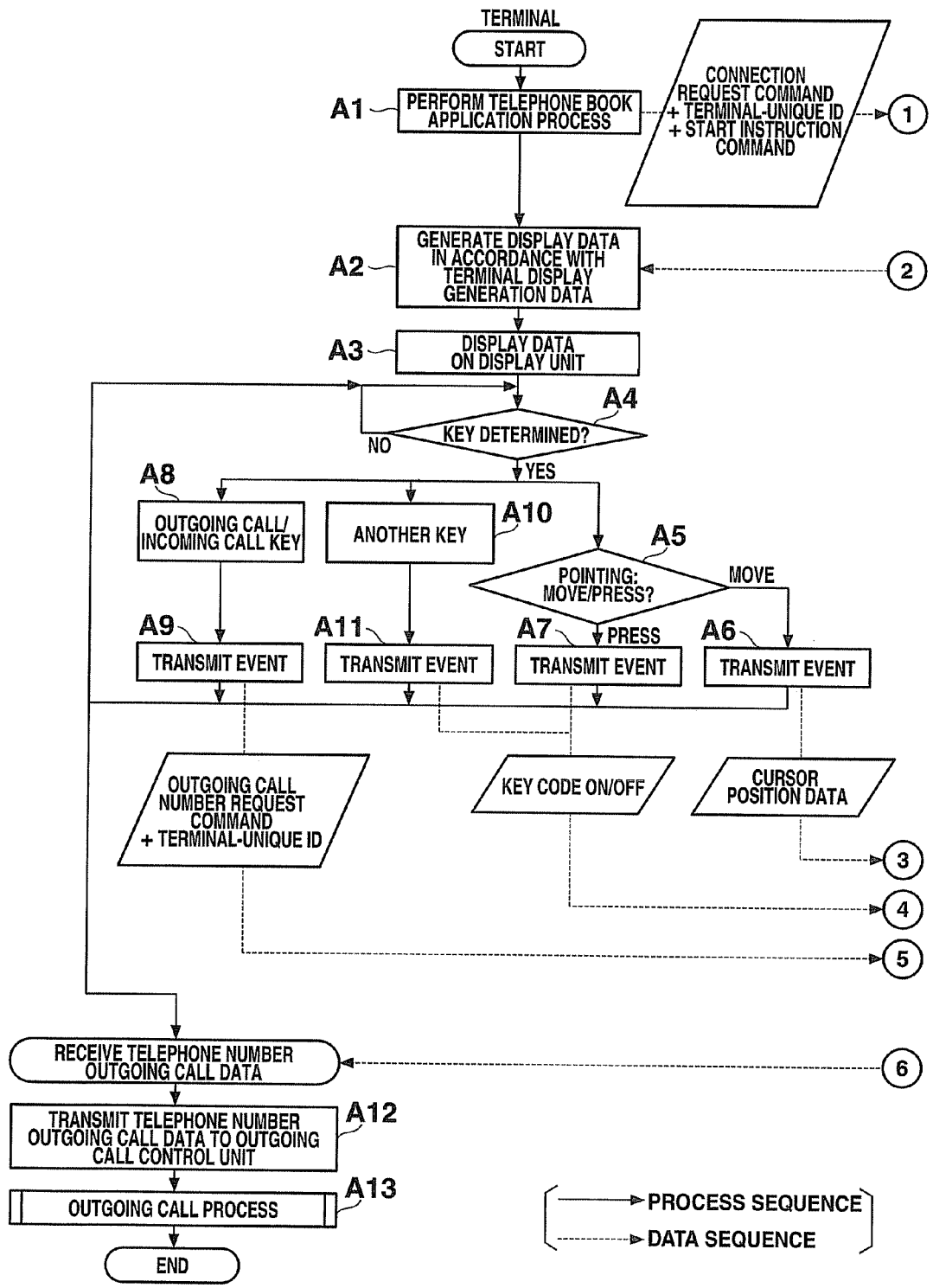
FIG. 5A is a flowchart showing the process executed by the cellular phone (terminal) 20 when making an outgoing call based on the telephone book list displayed from the server apparatus 30 to the cellular phone (terminal) 20 in the server-client system 10 serving as a thin client system.

FIG. 5A is a flowchart showing the process executed by the cellular phone (terminal) 20 when making an outgoing call based on the telephone book list displayed from the server apparatus 30 to the cellular phone (terminal) 20 in the server-client system 10 serving as the thin client system.

Figure 5B:
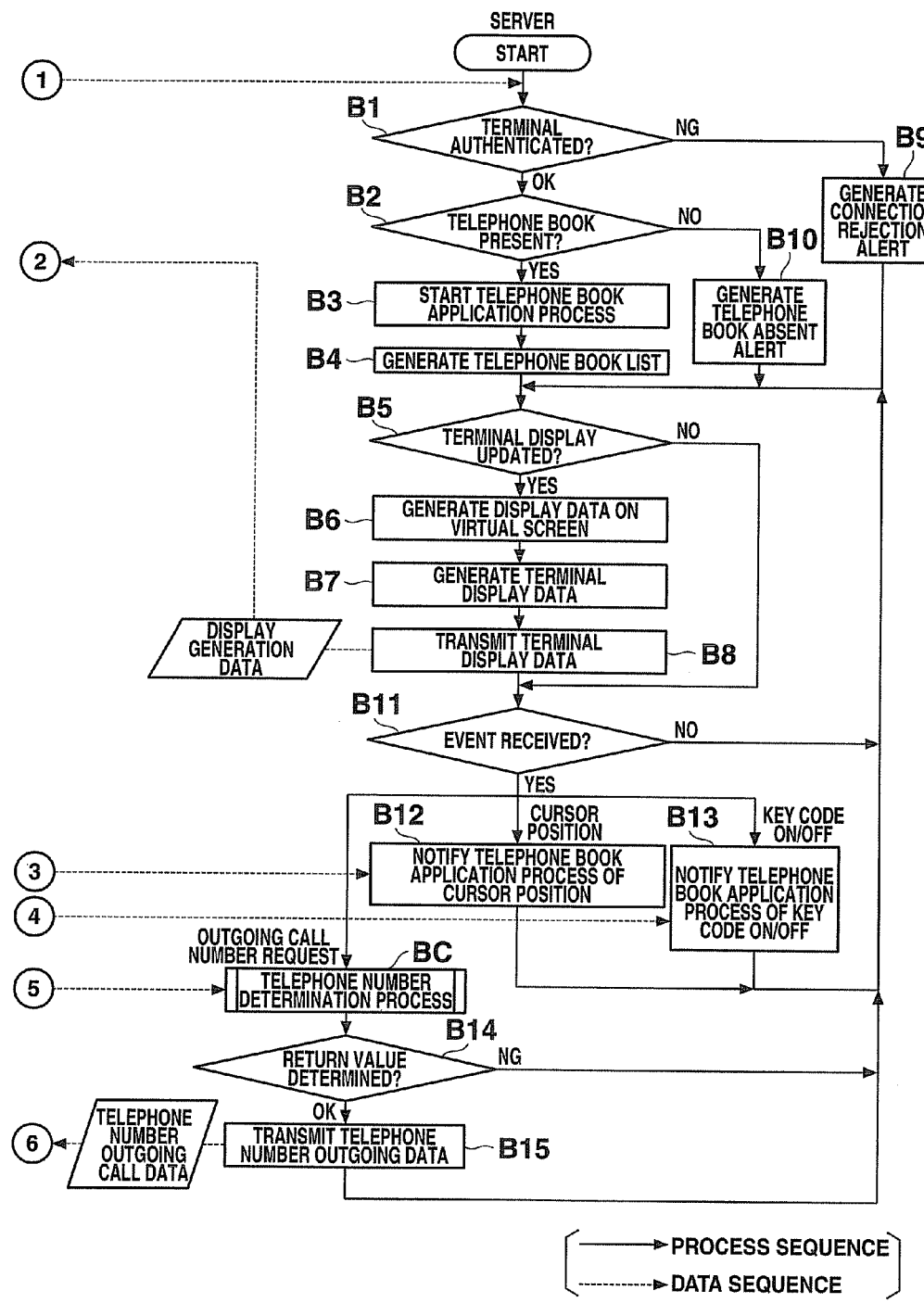
FIG. 5B is a flowchart showing the process executed by the server apparatus 30 when making the outgoing call based on the telephone book list displayed from the server apparatus 30 to the cellular phone (terminal) 20 in the server-client system 10 serving as the thin client system.

FIG. 5B is a flowchart showing the process executed by the server apparatus 30 when making an outgoing call based on the telephone book list displayed from the server apparatus 30 to the cellular phone (terminal) 20 in the server-client system 10 serving as the thin client system.

Figure 6:
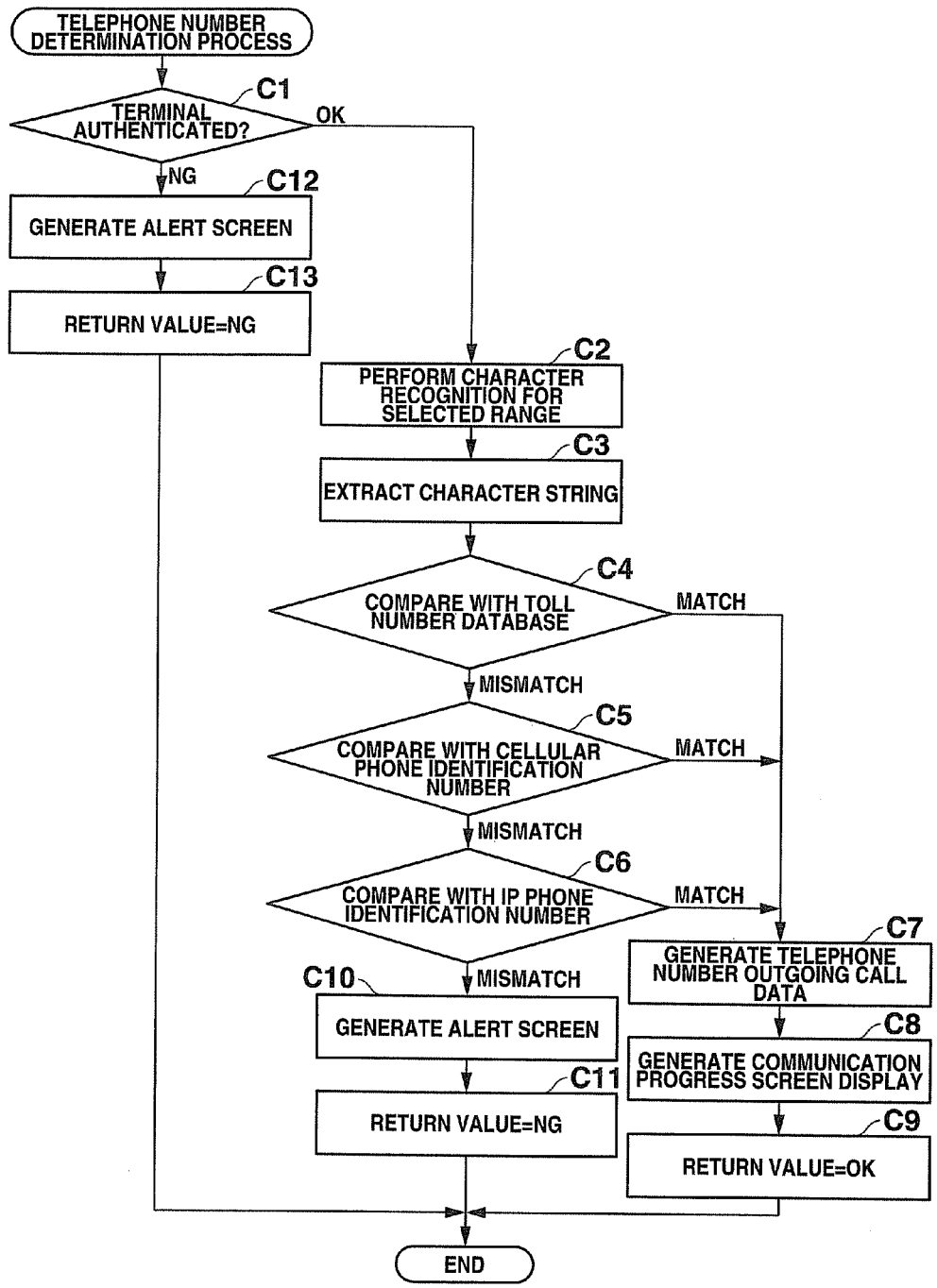
FIG. 6 is a flowchart showing a telephone number determination process executed along with the process of the server apparatus 30.

FIG. 6 is a flowchart showing a telephone number determination process executed along with the process of the server apparatus 30 when the user operates the telephone book button 21d in the key input unit 21 of the cellular phone (terminal) 20 to instruct the telephone book application to start, a connection request command and telephone book application start instruction command for the server apparatus 30 are transmitted from the wireless LAN communication unit 24 to the server apparatus 30 together with the terminal-unique ID read out from the unique ID storage unit 29 of the cellular phone (terminal) 20 (act A1 in the flowchart shown in FIG. 5A).

When the server apparatus 30 receives, via the wireless LAN communication unit 32, a connection request command and telephone book application start instruction command transmitted together with the terminal-unique ID from the cellular phone (terminal) 20, it is determined whether the received terminal-unique ID matches the terminal ID 37a stored in advance in the data storage unit 37 of the server apparatus 30. As a result, "connection: OK" or "connection: NG" is communicated to the cellular phone (terminal) 20 to carry out authentication (act B1).

In act B1, when "connection: OK" is received indicating positive authentication by determining that the terminal-unique ID received from the cellular phone (terminal) 20 matches the stored terminal ID 37a, it is determined whether the telephone book data 37b corresponding to the terminal ID 37a is stored and managed by the data storage unit 37, i.e., whether the telephone book data 37b is "present" or "absent" for unique terminal ID 37a (act B2).

In act B2, when it is determined that the telephone book data 37b corresponding to the terminal ID 37a of the connected cellular phone (terminal) 20 is "present", the telephone book application process starts (act B3). The telephone book list and its display data are generated based on the telephone book data 37b, and stored in the virtual screen memory 35 as shown in FIG. 4A (acts B4, 35, and B6).

After that, the display data conversion unit 36 converts the telephone book list display data in the virtual screen memory 35 into the drawing data in order to match the screen size of the terminal which typically displays the items "name" and "telephone number" as shown in FIG. 4B (act B7). Although not shown, additional items from the telephone book list display data in the virtual screen memory 35 may be include in the drawing data. The converted drawing data is then transferred to the connected cellular phone (terminal) 20 serving as a start request source of the telephone book application (act B8).

Upon receipt of the telephone book list drawing data transferred from the server apparatus 30, the cellular phone (terminal) 20 causes the display data generation unit 27 to generate the drawing data as the display data (act A2), and displays the obtained display data as the telephone book list telephone number display screen G1 on the liquid crystal display unit 22 as shown in FIG. 4B (act A3) (see FIG. 2A).

With this operation and system, even if the cellular phone (terminal) 20 does not store and/or manage the telephone book data, the telephone book data securely maintained in the server apparatus 30 can be displayed as the telephone book list on the display unit 22 of the cellular phone (terminal) 20.

On the other hand, when the server apparatus 30 communicates "connection: NG" due to failed authentication upon determining that the terminal-unique ID received from the cellular phone (terminal) 20 does not match the stored terminal ID 37a, connection rejection alert display data is generated, and stored and saved in the virtual screen memory 35 (acts B9, B5, and B6). The display data is then converted into the drawing data on the connection rejection alert screen G2 so as to match the screen size of the terminal (act B7). For example, as shown in FIG. 2B, the converted drawing data is transferred to the cellular phone (terminal) 20, and displayed on the liquid crystal display unit 22 (acts B8, A2, and A3).

As shown in act 32, when the server apparatus 30 determines that the telephone book data 37b corresponding to the terminal ID 37a of the connected cellular phone (terminal) 20 is "absent", telephone book absent alert display data is generated, stored, and saved in the virtual screen memory 35 (acts 310, B5, and B6). The generated display data is then converted into the drawing data of the telephone book absent alert screen (not shown) so as to match the screen size of the terminal (act B7). After that, the converted drawing data is transferred to the cellular phone (terminal) 20, and displayed on the liquid crystal display unit 22 (acts 38, A2, and A3).

Note that the terminal display drawing data which is generated and stored in the virtual screen memory 35 of the server apparatus 30 is rewritten and updated only when its image changes. The drawing data is then transferred to and displayed on the cellular phone (terminal) 20 (acts B5 to B8→acts A2 and A3).

FIGS. 7A to 7C are views showing telephone number range designation display states on the telephone book list telephone number display screen G1 displayed on the cellular phone (terminal) 20 in the server-client system.

When it is determined that the user operates the cursor key 21b in a state wherein the liquid crystal display unit 22 of the cellular phone 20 displays the telephone book list display drawing data transferred from the server apparatus 30, as shown in FIG. 4B, in accordance with the processes in act A1→acts B1 to B8→acts A2 and A3, the cursor position data serving as a key operation event on the display screen is transmitted to the server apparatus 30 (act A4→step A5→act A6).

Upon receipt of the cursor position data serving as the key operation event transmitted from the cellular phone 20 (act B11), the server apparatus 30 notifies the active telephone book application process of the received cursor position data (act B12). A cursor K is written at a position corresponding to the cursor position data, and the display screen is generated as the drawing data on the telephone book list telephone number display screen G1 as shown in FIG. 7A. This drawing data is then transferred to the cellular phone (terminal) 20, and displayed on the display unit 22 of the cellular phone (terminal) 20 (act B5 to B8, A2, and A3).

As shown in FIG. 7A, when it is determined that the determination/execution key 21c is operated in a state wherein the cursor K is moved to and displayed at the start position of a desired telephone number on the telephone book list telephone number display screen G1 displayed on the liquid crystal display unit 22 of the cellular phone (terminal) 20, a determination/execution ON signal serving as the key operation event is transmitted to the server apparatus 30 (act A4→act A5→act A7).

Upon receipt of the determination/execution ON signal serving as the key operation event transmitted from the cellular phone 20 (act B11), the server apparatus 30 notifies the active telephone book application process of the received determination/execution ON signal (act B13). As shown in FIG. 7A, the position of the cursor K at the start position of the telephone number on the telephone book list telephone number display screen G1 is determined as the start position for range designation display.

In this case, since the drawing data of the telephone book list telephone number display screen G1 containing the cursor K generated and stored in the virtual screen memory 35 of the server apparatus 30 is not updated at all, the drawing data is not updated (act B5→act B11).

In the cellular phone 20, assume that the cursor key 21b moves the cursor K in the right direction to designate the range of the telephone number from the start position of the telephone number on the telephone book list telephone number display screen G1 as shown in FIG. 7A. In this case, as the cursor position data is transmitted to the server apparatus 30 (act A4→act A5→act A6), the server apparatus 30 generates the telephone book list telephone number display screen G1 with a highlighted cursor designation range KH as shown in FIG. 7B (act B11→act B12→acts B5 to B7). The generated telephone book list telephone number display screen G1 is then transferred to the cellular phone (terminal) 20 and displayed on the cellular phone (terminal) 20 (act B8→acts A2 and A3).

After that, the following processes are repeated as needed. That is, the cursor position data in response to the operation of the cursor key 21b of the cellular phone 20 is transmitted to the server apparatus 30 (act A4→act A5→act A6). Upon reception of the cursor position data, the server apparatus 30 generates the telephone book list telephone number display screen G1 with the highlighted cursor designation range KH, and transmits the telephone book list telephone number display screen G1 (act B11→act B12→acts B5 to B8). The cellular phone 20 then receives and displays the telephone book list telephone number display screen G1 with the highlighted cursor designation range KH (acts A2 and A3). As shown in FIG. 7C, when it is determined that the user operates the determination/execution key 21c in a state wherein the entire range of the desired telephone number [03-1234-5678] is highlighted as the cursor designation range KH, the determination/execution ON signal as the key operation event is transmitted to the server apparatus 30 (act A4→act A5→act A7).

The server apparatus 30 receives the determination/execution ON signal as the key operation event transmitted from the cellular phone 20, and notifies the active telephone book application process of the determination/execution ON signal (act B11→act B13). As shown in FIG. 7C, the cursor designation range KH corresponding to the telephone number [03-1234-5678] on the telephone book list telephone number display screen G1 is determined as the selected range.

With this process and system, when it is determined that the user operates the outgoing call/incoming call button 21e in a state wherein the display unit 22 of the cellular phone 20 displays the highlighted cursor designation range KH corresponding to the desired telephone number [03-1234-5678] on the telephone book list telephone number display screen G1, an outgoing call number request command serving as the key operation event is transmitted to the server apparatus 30 together with the terminal-unique ID stored in the unique ID storage unit 29 (act A4→act A8→act A9).

Upon reception of the outgoing call number request command serving as the key operation event from the cellular phone 20 together with the terminal-unique ID (act B11), the server apparatus 30 starts a telephone number determination process as shown in FIG. 6 (act BC).

In this telephone number determination process, it is determined whether the terminal-unique ID received from the cellular phone (terminal) 20 matches the terminal ID 37a stored in the data storage unit 37, and "authentication: OK" or "authentication: NG" is determined (act C1).

In step C1, when "authentication: OK" is determined upon determining that the terminal-unique ID received from the cellular phone (terminal) 20 matches the stored terminal ID 37a, a character recognition process is performed for an image of the selected range serving as the cursor designation range KH on the telephone book list telephone number display screen G1 which is converted by the display data conversion unit 36 and based on the virtual screen memory 35 corresponding to the cellular phone (terminal) 20 (act C2). As a result, the recognized character string (in this case, the telephone number [0312345678]) is extracted (act C3).

The recognized character string obtained from the image of the selected range serving as the cursor designation range KH can be sequentially compared with a toll number database such as "03", "04", and "06", cellular phone identification numbers such as "090" and "080", and an IP phone identification number "050" which are stored in the data storage unit 37 in advance. It is then determined whether the recognized character string matches one of these numbers, and it is confirmed whether the recognized character string is a telephone number (acts C4 to C6).

For example, as shown in FIG. 7C, when the recognized character string [0312345678] obtained from the selected range serving as the cursor designation range KH matches the toll number database, it is determined that the recognized character string is the telephone number (act C4). In this case, telephone number outgoing call data is generated in accordance with the character code (numeric code) as the telephone number [0312345678] (act C7), and the communication progress screen W (see FIG. 2A) for notifying that an outgoing call communication to this telephone number is in progress (act C8). After that, "OK" is set as a return value to return to the main process of the server (act C9). In the above description, the character string is recognized from the selected range serving as the cursor designation range KH. However, the character code as a display source may be directly read out to generate the telephone number outgoing call data without recognizing the character string when the character code as the display source corresponding to the cursor designation range can be read out.

When it is determined that the return value is "OK" (act B14), the telephone number outgoing call data corresponding to the telephone number [0312345678] generated in act C7 in the telephone number determination process is transmitted to the cellular phone (terminal) 20 (act B15).

Upon receipt of the telephone number outgoing call data [0312345678] from the server apparatus 30, the cellular phone (terminal) 20 transfers the telephone number outgoing call data to the outgoing call/incoming call control unit 26 to make the outgoing call via the cellular phone network communication unit 25 (acts A12 and A13).

Along with this, the server apparatus 30 generates the display drawing data in which the communication progress screen W generated in act C8 in the telephone number determination process overlaps the telephone book list telephone number display screen G1 with the highlighted cursor designation range KH, and transfers the display drawing data to the cellular phone (terminal) 20 (acts B5 to B8). As shown in FIG. 2A, the liquid crystal display unit 22 of the cellular phone (terminal) 20 displays the transferred display drawing data (acts A2 and A3).

As described above, the outgoing call can be made by selecting the desired telephone number range on the telephone book list telephone number display screen G1 transferred from the server apparatus 30 and displayed as the drawing data on the cellular phone (terminal) 20. In addition, the cellular phone (terminal) 20 can display the telephone book list telephone number display screen G1 which overlaps the communication progress screen W for notifying that the outgoing call to the telephone number is in progress.

On the other hand, assume that in the telephone number determination process (see FIG. 6) of the processes (see FIG. 5B) of the server apparatus 30, as shown in, e.g., FIG. 8A or 8B, the recognized character string (acts C1 to C3) obtained from the image of the selected range serving as the cursor designation range KH on the telephone book list telephone number display screen G1 does not match any of the toll number database, cellular phone identification number, and IP telephone identification number, and it is determined that the recognized character string is not the telephone number (acts C4 to C6 (mismatch)). In this case, a number range reselection alert screen G3 (see FIG. 8C) which prompts the user to reselect the telephone number is generated (act C10), and "NG" is set as the return value to return to the main process (step C11).

Upon determining that the return value is "NG" (act B14), the server apparatus 30 generates the display drawing data in which the number range reselection alert screen G3 generated in act C10 in the telephone number determination process overlaps the telephone book list telephone number display screen G1, and transfers the display drawing data to the cellular phone (terminal) 20 (acts B5 to B8). As shown in FIG. 8C, the liquid crystal display unit 22 of the cellular phone (terminal) 20 displays the transferred drawing data to prompt the user to reselect the telephone number (acts A2 and A3).

FIGS. 8A to 8C are views showing telephone number error range designation display states on the telephone book list telephone number display screen G1 displayed on the cellular phone (terminal) 20 in the server-client system, and a number range reselection alert screen G3 as a range selection result.

Assume that when the process shifts to the telephone number determination process (see FIG. 6) of the processes (see FIG. 5B) of the server apparatus 30, the terminal-unique ID received from the cellular phone (terminal) 20 does not match the stored terminal ID 37a, and "authentication: NG" is determined (act C1) In this case, the connection rejection alert display data is generated (act C12), and "NG" is set as the return value to return to the main process (act C13).

Upon determining that the return value is "NG" (act B14), the server apparatus 30 generates the display drawing data of the connection rejection alert screen G2 generated in act C12 in the telephone number determination process, and transfers the display drawing data to the cellular phone (terminal) 20 (acts B5 to B8). For example, as shown in FIG. 2B, the liquid crystal display unit 22 of the cellular phone (terminal) 20 displays the transferred display drawing data (acts A2 and A3).

Accordingly, in the server-client system 10 having the above-described configuration, when the user operates the telephone book button 21d of the cellular phone (terminal) 20, the cellular phone (terminal) 20 transmits the start instruction command of the telephone book application to the server apparatus 30 together with the terminal-unique ID and connection request command. The server apparatus 30 reads out the telephone book data stored and managed in correspondence with the terminal-unique ID, generates the telephone book list telephone number display screen G1, and transfers it to the cellular phone (terminal) 20 to display it. Assume that the range of the desired telephone number is selected by the cursor K on the telephone book list telephone number display screen G1 displayed by the cellular phone (terminal) 20, the cursor designation range KH is displayed and confirmed by operating the server apparatus 30 based on the key operation signal, and the user operates the call origination/termination button 21e. In this case, the server apparatus 30 performs the character recognition process for a portion corresponding to the cursor designation range KH on the telephone book list telephone number display screen G1. The server apparatus 30 then generates the outgoing call data in accordance with the numeric code of the telephone number as the character recognition result, and transfers it to the cellular phone (terminal) 20 to execute outgoing call control.

Therefore, confidentiality can be secured and communications performed without storing and holding the telephone book data in the cellular phone (terminal) 20. Additionally, the desired telephone number can be selected even from the telephone book list telephone number display screen G1 serving as the bitmap data transferred from the server apparatus 30 and displayed on the cellular phone (terminal) 20 to make an outgoing call.

Note that in the server-client system 10 of this embodiment, the character recognition process is performed for the portion corresponding to the cursor designation range KH on the telephone book list telephone number display screen G1 to determine whether the portion is the telephone number, and the telephone number outgoing call data is generated in accordance with the character code (numeric code) of the recognized character string. However, the processes and systems described herein are not limited to this operation. For example, when the user operates the outgoing call/incoming call button 21e, the character recognition process may be performed for the image data around the cursor position without designating and displaying the cursor designation range KH, and the telephone number designated by the cursor may be extracted. Note that it is not always necessary to display the telephone book list. A similar process can also apply when displaying the telephone number display screen added to a document or the like transferred from the server apparatus 30 to the cellular phone (terminal) 20.

Also, the server-client system 10 described herein may be not only a network based on a wireless LAN but also a network based on a wired LAN or fixed telephone line.

Note that each processing technique in the server-client system 10 as described herein, i.e., an entire operation control process of the server apparatus 30 shown in the flowchart in FIG. 5B, or the telephone number determination process along with the entire operation control process of the server apparatus 30 shown in the flowchart in FIG. 6 can be distributed as a computer-executable program stored in an external recording device such as a memory card (ROM card, RAM card, or the like), magnetic disk (floppy disk, hard disk, or the like), optical disk (CD-ROM, DVD, or the like), and semiconductor memory. The computer (CPU 31) of the server apparatus 30 loads the program in a storage device (data storage unit 37) from the external recording medium and controls the operation in accordance with the loaded program. As a result, the telephone outgoing call control function is implemented in the cellular phone (terminal) 20 serving as a thin client terminal by using the telephone book data stored and managed by the server apparatus 30 as described herein to implement the same process by the above-described technique.

Program data used to implement the above-described technique can be transmitted as a program code via a communication network, such as a LAN. The storage device (data storage unit 37) loads the program data received from the computer apparatus (program server) connected to the communication network (LAN), and the cellular phone (terminal) 20 serving as the thin client terminal can implement the telephone outgoing call control function by using the telephone book data stored and managed by the server apparatus 30.

As utilized herein, the term "component" is intended to refer to a computer-related entity including computers, servers, and cellular phones, either hardware, software (e.g., in execution), and/or firmware. For example, a component can be a process running on a processor, a processor, a circuit, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or system using standard programming and/or engineering techniques to produce software, firmware, hardware, devices, systems or any combination thereof to control a computer-related entity to implement the disclosed subject matter.

In regard to the various functions performed by the above described components, devices, circuits, systems, processes, and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it is also to be recognized that the innovation includes a system as well as a computer-readable medium having computer-executable instructions for performing the acts and/or events of the various methods of the claimed subject matter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server apparatus connected to a client terminal of a user through a communication network, comprising:
    code information storing means for storing a plurality of code information elements;
    storage management means for generating a drawing image in which a plurality of identification images corresponding to each of the plurality of code information elements are drawn at different display coordinate positions in a display screen image and stores and manages the code information elements that correspond to each identification image by associating with the display coordinate positions of the identification image;
    transmission control means for transmitting the generated drawing image to the client terminal through the communication network;
    reception control means for receiving, in the client terminal at which a display screen image of the drawing image is displayed, coordinate information when the coordinate information of the display coordinate positions indicated arbitrarily by the user on the display screen image is transmitted from the client terminal through the communication network;

selection means for selecting code information elements corresponding to an identification image in the drawing image represented by the coordinate information received by the reception control means by referring to the storage management means; and process control means for executing control of a process based in the code information elements selected in the selection means.

2. The server apparatus of claim 1, wherein the code information storing means stores code information elements of a plurality of telephone number codes as telephone book data;

the storage management means generates a drawing image in which a plurality of identification images based on telephone number images enabling the telephone number codes to be visually identified respectively are drawn;

the selection means selects a telephone number code corresponding to an identification image based on a telephone number image at a portion corresponding to a drawing position in the drawing image represented by the coordinate information.

3. The server apparatus of claim 1, wherein the process control means executes a process of transmitting code information elements selected by the selection means to the client terminal.

4. The server apparatus of claim 3, wherein the reception control means further receives from the client terminal terminal identification information for identifying the client terminal; and the process control means discriminates whether the received terminal identification information corresponds to preliminarily registered identification information on not and, if it is discriminated that the received terminal identification information corresponds to preliminarily registered identification information, transmits code information elements selected by the selection means to the client terminal which has transmitted the terminal identification information.

5. A program storage medium corresponding to claim 1, comprising:

a non-transitory program storage medium in a server apparatus executing communications with an external terminal apparatus, the server apparatus connected to a client terminal of a user through a communication network, comprising:

code information storing means for storing a plurality of code information elements;

storage management means for generating a drawing image in which a plurality of identification images corresponding to each of the plurality of code information elements are drawn at different display coordinate positions in a display screen image and stores and manages the code information elements that correspond to each identification image by associating with the display coordinate positions of the identification image;

transmission control means for transmitting the generated drawing image to the client terminal through the communication network;

reception control means for receiving, in the client terminal at which a display screen image of the drawing image is displayed, coordinate information when the coordinate information of the display coordinate positions indicated arbitrarily by the user on the display screen image is transmitted from the client terminal through the communication network;

selection means for selecting code information elements corresponding to an identification image in the drawing image represented by the coordinate information received by the reception control means by referring to the storage management means; and process control means for executing control of a processor based on the code information selected in the selection means.

6. A server-client system comprising a client terminal and a server apparatus on a network, the server apparatus comprising:

code information storing means for storing a plurality of code information elements;

storage management means for generating the drawing image in which the plurality of identification images corresponding to each of the plurality of code information elements are drawn at the different display coordinate positions in a display screen image and stores and manages the code information elements that correspond to each identification image by associating with the display coordinate position of the identification image;

transmission control means for transmitting the generated drawing image to a client terminal through a communication network;

reception control means for receiving, in the client terminal at which the display screen image of the drawing image is displayed, coordinate information when the coordinate information of the display coordinate position indicated arbitrarily by the user on the display screen image is transmitted from the client terminal through the communication network; and selection means for selecting a code information element corresponding to an identification image in the drawing image represented by the coordinate information received by the reception control means by referring to the storage management means, the client terminal comprising:

terminal reception control means for receiving a drawing image from the server apparatus through a communication network;

screen displaying means for displaying the display screen image on a display screen, based on the drawing image received by the terminal reception control means; and terminal transmission control means for transmitting to the server apparatus coordinate information representing a display coordinate position indicated arbitrarily by the user on the display screen image displayed on the display screen.

7. The server-client system of claim 6, wherein the client terminal further comprises second reception control means for controlling the code information specified at the server apparatus to be received; and the server apparatus further comprises second transmission control means for controlling the code information elements as selected by the selection means to be transmitted to the client terminal.

* * * * *